(12) United States Patent
Bazzo et al.

(10) Patent No.: US 9,346,206 B2
(45) Date of Patent: May 24, 2016

(54) FIXING PLATE OF A MOLD OF AN INJECTION MOLDING APPARATUS FOR PLASTIC MATERIAL

(71) Applicant: INGLASS S.p.A., San Polo di Piave (Treviso) (IT)

(72) Inventors: Maurizio Bazzo, Treviso (IT); Nico Trevisiol, Treviso (IT)

(73) Assignee: INGLASS S.p.A., San Polo di Piave (Treviso) (IT)

( * ) Notice: Subject to any disclaimer, the term of this patent is extended or adjusted under 35 U.S.C. 154(b) by 0 days.

(21) Appl. No.: 14/638,309

(22) Filed: Mar. 4, 2015

(65) Prior Publication Data

US 2015/0251346 A1 Sep. 10, 2015

(30) Foreign Application Priority Data

Mar. 10, 2014 (IT) .............................. TO2014A0188

(51) Int. Cl.
*B29C 45/23* (2006.01)
*B29C 45/70* (2006.01)
*B29L 31/00* (2006.01)
*B29C 45/28* (2006.01)

(52) U.S. Cl.
CPC ............... *B29C 45/70* (2013.01); *B29C 45/281* (2013.01); *B29C 45/2806* (2013.01); *B29C 2045/282* (2013.01); *B29C 2045/2824* (2013.01); *B29C 2045/2834* (2013.01); *B29L 2031/772* (2013.01)

(58) Field of Classification Search
CPC .......................... B29C 45/281; B29C 45/2806
USPC .......................... 425/562, 563, 564, 565, 566
See application file for complete search history.

(56) References Cited

U.S. PATENT DOCUMENTS

| 6,113,381 | A * | 9/2000 | Gellert et al. | B29C 45/281 |
| | | | | 425/564 |
| 6,294,122 | B1 * | 9/2001 | Moss | B29C 45/281 |
| | | | | 425/564 |
| 7,588,436 | B2 * | 9/2009 | Tooman | B29C 45/281 |
| | | | | 425/564 |
| 2012/0225160 | A1 * | 9/2012 | Schwenk | B29C 45/281 |
| | | | | 425/564 |
| 2014/0037781 | A1 * | 2/2014 | Bazzo | B29C 45/281 |
| | | | | 425/564 |

FOREIGN PATENT DOCUMENTS

EP 2679374 1/2014

OTHER PUBLICATIONS

Italian Search Report and Written Opinion for Italian Application No. ITTO20140188 mailed Dec. 11, 2014.
"Flexflow", Oct. 15, 2013, XP054975575, Retrieved from the Internet: URL:http://youtube.com/watch?v=G2-cv79Hpeg Retrieved Oct. 27, 2014.

* cited by examiner

*Primary Examiner* — Tim Heitbrink
(74) *Attorney, Agent, or Firm* — Remarck Law Group PLC

(57) ABSTRACT

An injection molding apparatus of plastic material including a mold, a fixing plate of the mold, a distributor of the plastic material to be injected and a plurality of injectors connected to the distributor and each including a valve pin controlled by a respective rotary electric motor and a transmission. The fixing plate has a cavity facing the mold on a first face, within which the distributor is contained, and each electric motor with the relative transmission is housed, in a quickly insertable and removable manner, within a respective seat arranged on a second face of the fixing plate opposite to the first face, laterally with respect to the corresponding injector.

17 Claims, 7 Drawing Sheets

FIXING PLATE OF A MOLD OF AN INJECTION MOLDING APPARATUS FOR PLASTIC MATERIAL

CROSS REFERENCE TO RELATED APPLICATIONS

This application claims priority to Italian Patent Application No. TO2014A000188 filed on Mar. 10, 2014, the entire disclosure of which is incorporated herein by reference.

FIELD OF THE INVENTION

The present invention relates in general to apparatuses for injection molding of plastic material of the type comprising a mold, a fixing plate of the mold, a distributor of the plastic material to be injected, and a series of injectors connected to the distributor to inject the plastic material into the mold cavity.

In the molding apparatuses of the so-called obturator type, each injector comprises a nozzle connected to the distributor, and within which a valve pin is axially movable, operated by a motor that controls its movement between a closed position and an open position, to allow the flow of fluid plastic material under pressure from the distributor to the mold cavity.

Particularly, the invention relates to the fixing plate of the mold of such an injection molding apparatus.

STATE OF THE PRIOR ART

In injection molding apparatuses of the aforesaid type, the operation of the injector valves can be carried out by fluid or electrical motors.

The use of electrical motors, compared with systems that use fluid actuators (hydraulic or pneumatic) for this function, have the advantage of allowing a continuous control and therefore more accurate and precise position of the valve pin and, consequently, of the flow of the fluid plastic material from the distributor, or hot chamber, into the mold cavity.

The European patent application EP-2679374 by the same Applicant describes a molding apparatus of the type defined above, wherein the electric motor associated with each injector comprises a rotary electric motor and a transmission between the motor shaft and the valve pin, including a screw-and-nut assembly. The group formed by the rotary electric motor and the screw-and-nut assembly is carried by a support fixed directly to the distributor, according to a plurality of possible configurations relative to the axis of the injector.

This arrangement, as well as other solutions in which the actuator means envisage an electric motor directly mounted on the distributor, can lead to problems caused by the temperature of the distributor itself, both in terms of the mechanical profile, in relation to the rotating members, and the electrical profile, relative to the coils of the motor and its electronic components, as well as regarding the relative wiring subjected to premature aging and consequent rupture, or even fusion, of the relative casing. In these cases, it is necessary to replace the damaged parts, whose accessibility may be inconvenient, with the possible consequence of non-negligible operational pauses of the molding apparatus, as well as high direct and indirect costs. To avoid this drawback, it is therefore necessary to provide cooling systems of the motors.

The thermal decoupling of the (rotary or linear) electric motors from the distributor has already been proposed, for example, in the documents U.S. Pat. No. 7,018,198 and WO-2010/126330, applying them to the fixing plate of the mold. Another solution, described in document U.S. Pat. No. 7,214,048, envisages the installation of electric motors on an intermediate cooling block, arranged between the fixing plate of the mold and the distributor.

Documents U.S. Pat. No. 8,091,202 and U.S. Pat. No. 8,282,388 also describe injection molding systems in which the (electric or fluid) actuators are carried by the fixing plate of the mold and can be coupled and uncoupled relative to the valve pins of the injectors, by means of a radial movement.

In all these known solutions, the actuators are arranged with their axes aligned, or in any case parallel to the axis of the respective injectors.

These configurations all have the same drawback: considerably high dimensions of the fixing plate of the mold regarding the thickness, which implicates a corresponding considerable bulk of the molding apparatus as a whole. This overall bulk is further accentuated by the fact that the distributor is typically located below the support plate, or rather is interposed between this and the mold.

In addition, access to the actuators of the injectors, for example for maintenance or replacement, is usually complicated and inconvenient.

From the document U.S. Pat. No. 6,079,971, a fixing plate of the mold of an injection molding apparatus is known, having, on its face directed towards the mold, a seat within which the distributor is housed, whose bulk is essentially contained within the thickness of the plate. In this case, however, the injectors of the molding apparatus are not of the obturator-type, i.e. they are not associated with respective electric, or other types of, actuators, so that neither the problem of the separation of the actuators from the distributor arises, nor the problem relative to the bulk of the fixing plate deriving from the presence of actuators.

SUMMARY OF THE INVENTION

The object of the present invention is that of resolving the aforesaid problem relative to reducing the thickness of the fixing plate for a molding apparatus of the type defined above.

An additional object is that of producing a fixing plate for a molding apparatus of the type defined above, in which the access to the electric motors of the injectors, for their possible removal, is extremely easy and convenient.

In view of achieving these aims, the invention relates to a fixing plate of the mold of an injection molding apparatus as defined in the pre-characterizing part of claim 1, and generally corresponding to those described in the already cited documents U.S. Pat. Nos. 8,091,202 and 8,282,388, whose unique characteristic lies in the fact that, on a first face, it has a cavity facing towards the mold within which the distributor is contained, and in the fact that each electric motor with the relative transmission is housed in a quickly insertable and removable manner within a respective seat arranged on a second face of the fixing plate, opposite to said first face, laterally with respect to the corresponding injector.

Thanks to this solution idea, the actuator components (electric motors and mechanical transmissions) are not only effectively protected from the negative effects of the high temperatures of the distributor, but they are also made directly accessible for any repair or replacement operations. All this while maintaining the dimensions of the fixing plate, regarding its thickness, within extremely contained limits, with the advantage of a reduction in the overall dimensions of the total bulk of the molding apparatus.

This arrangement also offers the additional advantage, in multiple applications, of avoiding the need to equip the support plate with a cooling system with the relative channeling and relative connectors, gaining the advantage of a constructive simplification with subsequent lower costs.

Conveniently, the axis of each electric motor is arranged perpendicularly to the axis of the respective injector, and each electric motor is insertable and removable relative to the respective seat in a direction parallel to the axis of the injector, i.e. perpendicularly to the second face of the fixing plate.

Each electric motor is advantageously insertable and removable relative to the respective seat of the fixing plate, while the valve pin of the respective injector is kept stationary.

According to a preferred embodiment of the invention, the electric motor is a rotary motor and the transmission comprises a screw-and-nut assembly. The electric rotary motor and the screw-and-nut assembly are placed side-by-side and conveniently have respective axes parallel to each other, and perpendicular to the axis of the valve pin.

The transmission also advantageously includes an oscillating lever operatively interposed between the screw-and-nut assembly and the valve pin.

The oscillating lever can be carried by the distributor, and in this case, quick coupling means are provided between this oscillating lever and the screw-and-nut assembly. Alternatively, the oscillating lever can be carried by the screw-and-nut assembly, and in this case, quick coupling means are provided between this oscillating lever and the valve pin.

In both cases, the oscillating lever and the relative connections to the valve pin and/or to the screw-and-nut assembly are configured in order to compensate for possible thermal expansions of the distributor.

Additional characteristics of the fixing plate and the apparatus equipped with this fixing plate are stated in the dependent claims.

BRIEF DESCRIPTION OF THE DRAWINGS

The invention will now be described in detail with reference to the accompanying drawings, provided purely by way of non-limiting example, in which.

DETAILED DESCRIPTION OF THE INVENTION

Figure 1:
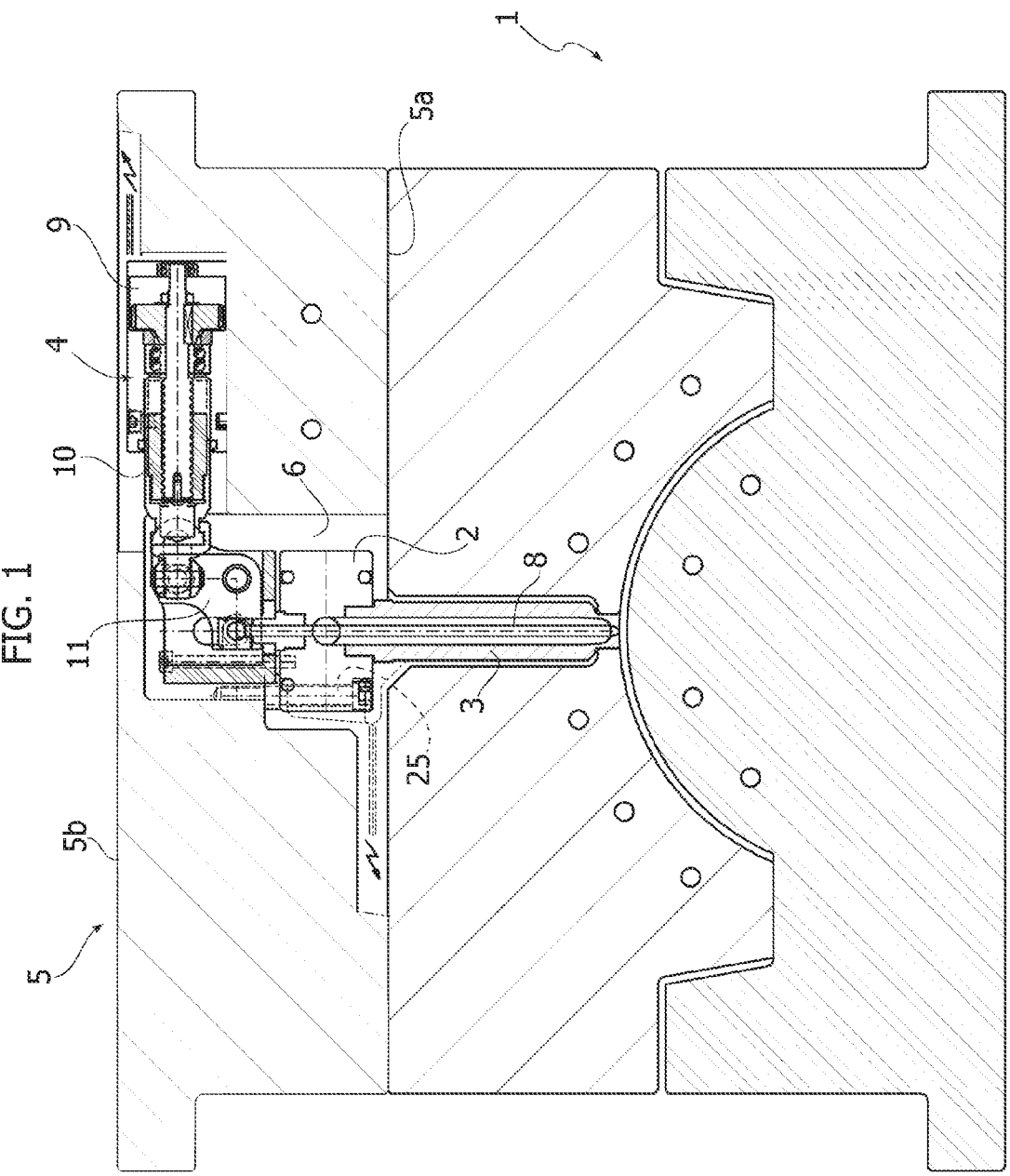
FIG. 1 is a schematic and sectional view of a part of a plastic injection molding apparatus including a fixing plate according to the invention.

Referring initially to FIG. 1, the injection molding apparatus according to the invention essentially comprises a mold generically indicated with 1, a distributor or hot chamber 2, filling injectors 3 the introduction of the fluid plastic material under pressure from the distributor 2 to the mold cavity 1, and an actuator device indicated generically with 4 for the operation of each injector 3.

Numeral 5 indicates a fixing plate or clamping plate configured, possibly in combination with additional plates, for fixing, in the manner known per se, of the mold 1 to the planes of the press of the injection apparatus. The term fixing plate should therefore not be considered in a limiting sense, but is specifically intended to designate any plate interposed between the mold 1 and the planes of the press.

Figure 2:
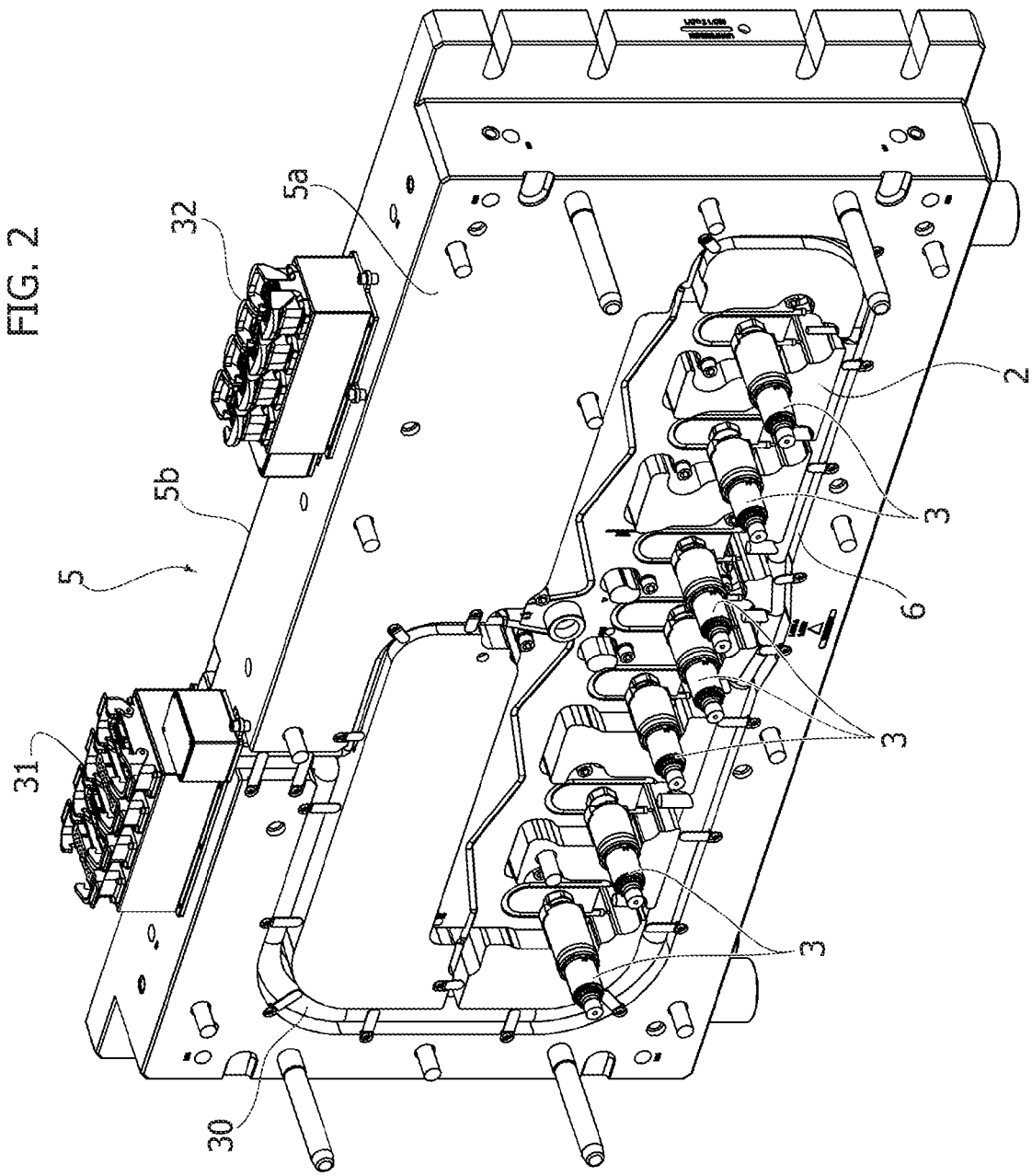
FIG. 2 is a front perspective view of the fixing plate.
Figure 3:
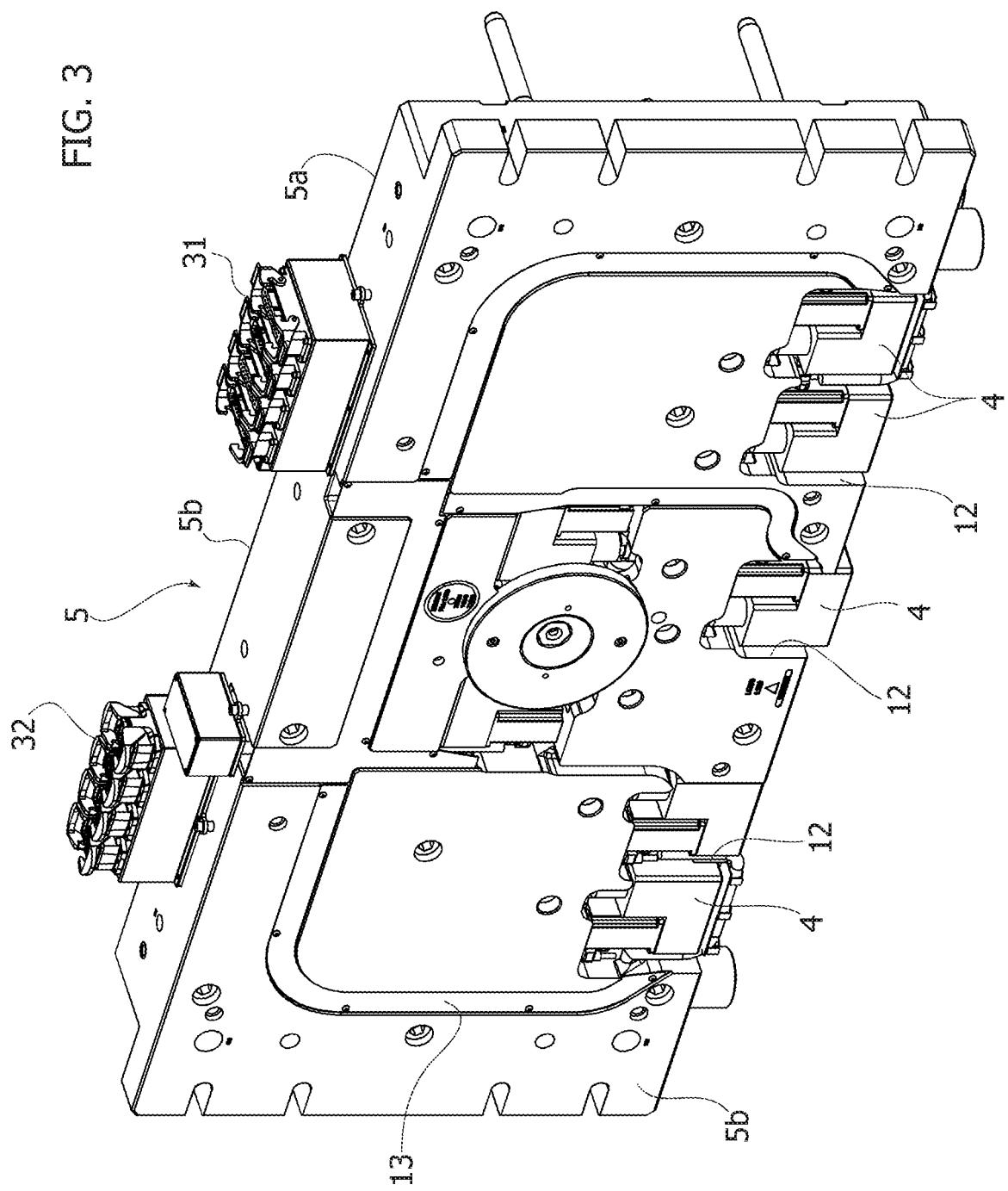
FIG. 3 is a dorsal perspective view of the fixing plate.
Figure 4:
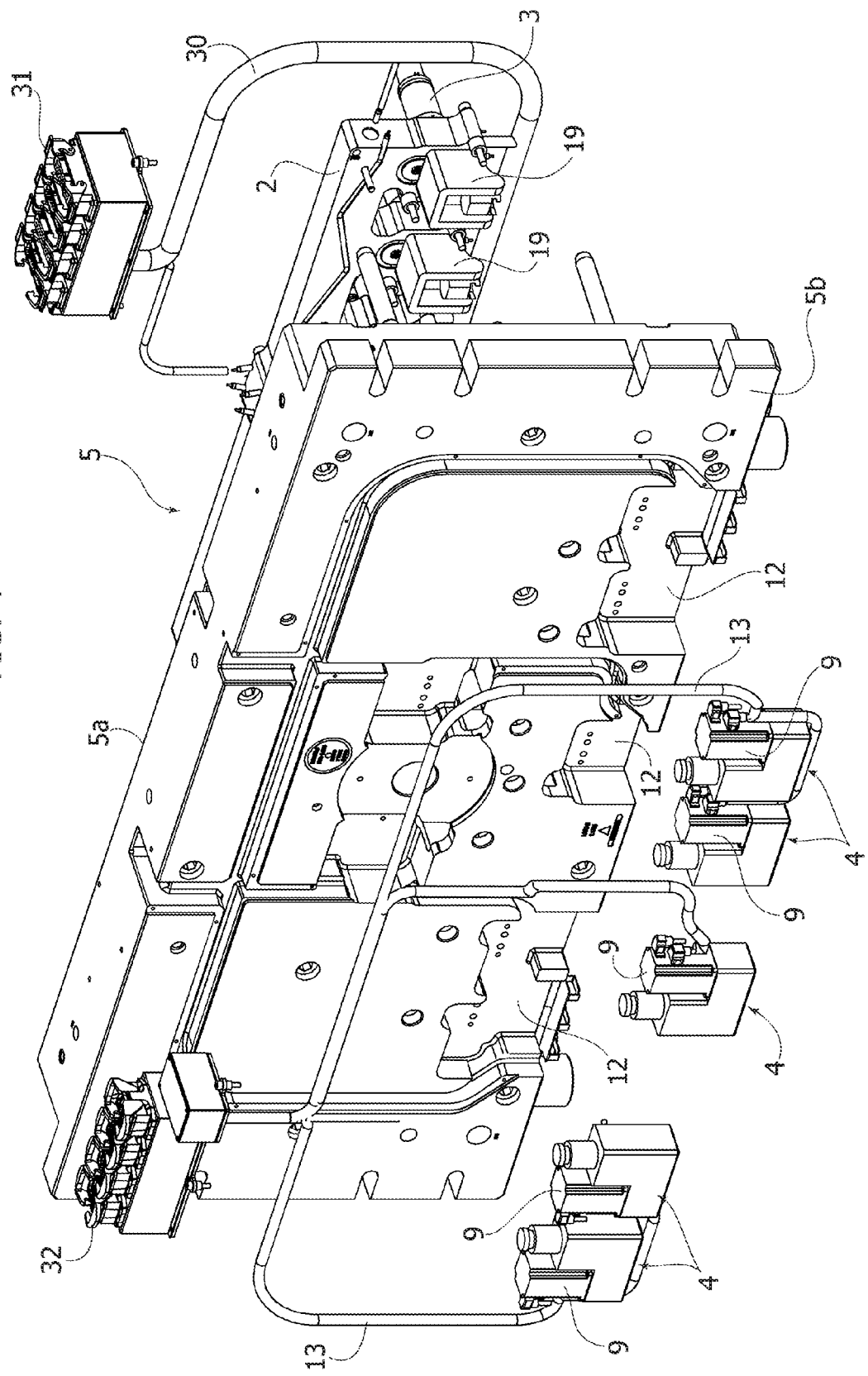
FIG. 4 is an exploded view of FIG. 3.

Referring now to FIGS. 2, 3 and 4, the fixing plate 5 according to the invention, compared with the state of art, has an appreciably reduced thickness and a greater constructive simplification thanks to the configuration described below.

According to a first aspect of the invention, the distributor 2 is housed and contained within a cavity 6 formed in the face 5a of the fixing plate 5 facing the mold 1, and from which the filling injectors 3 protrude. The distributor 2, electrically heated in a known manner by means of wiring 30 embedded in the face 5a, and connected to a terminal 31 applied to one side of the plate 5, is fixed to this without direct contact by means of thermal cutting studs 25, for example of titanium.

Each injector 3 comprises, in a conventional manner, a tubular nozzle 7 within which a valve pin 8 is axially displaceable between an advanced, closed position and a retracted, open position to allow the flow of fluid plastic material from the distributor 2 to the mold cavity 1.

Figure 6:
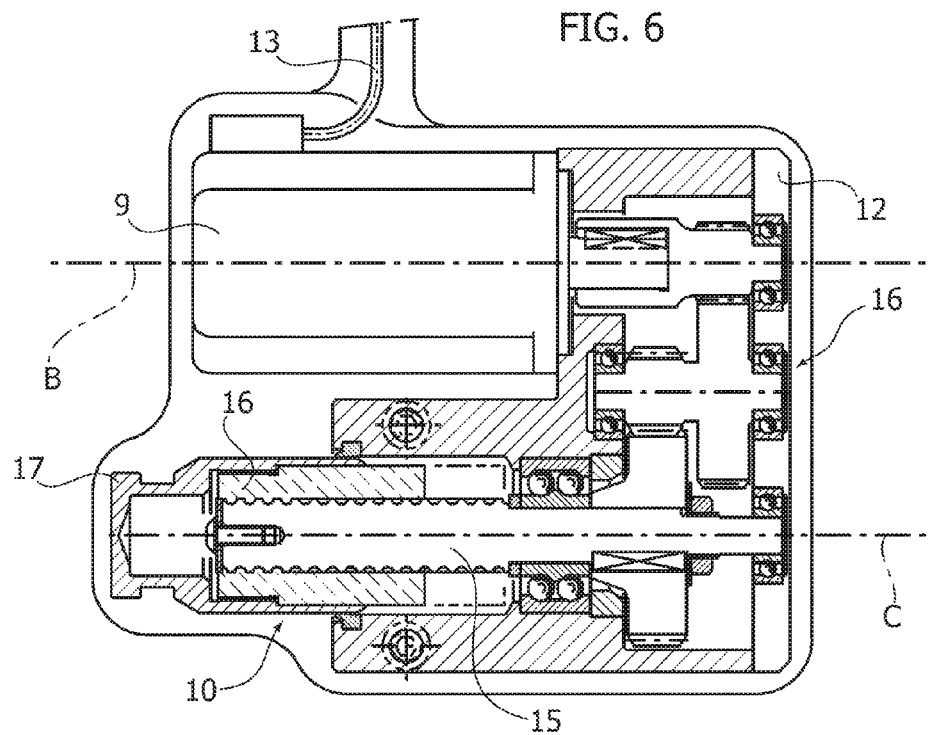
FIG. 6 is a horizontal sectional view on an enlarged scale according to the line VI-VI of FIG. 5.

The actuator device 4 that controls the movements of the valve pin 8 of each injector 3 comprises a rotary electric motor 9, most evident in FIG. 6, and a screw-and-nut assembly 10 connected to an oscillating lever 11.

The rotary electric motor 9 and the screw-and-nut assembly 10 form a group that, according to another aspect of the invention, is housed within a respective open seat 12 formed in the face 5b of the fixing plate 5, facing away from the mold 1, and communicating with the cavity 6. The seat 12 is arranged at the side of the cavity 6, so that the electric motor 9 and the screw-and-nut assembly 10 are carried by the fixing plate 5 in a laterally offset position with respect to the injector 3.

In this way, both the electric motor 9 with its electronic components and wiring 13, and the mechanical components related to the screw-and-nut assembly 10 result in being not only less exposed, and therefore less influenced by the thermal effects derived from the high temperature of the distributor 2, but also easily accessible from the outside for any maintenance or replacement operations.

The wiring 13, connected to a side terminal 32, are recessed into the face 5b of the plate 5, which physically separates them, in this way, from the wiring 30 of the distributor 2.

In the case of the illustrated example, the electric rotary motor 9 and the screw-and-nut assembly 10 are positioned within the seat 12 in a condition corresponding to the respective axes B and C, which are mutually parallel, and perpendicular to the axis A of the injector 3. It should be noted that the positioning could also be different, for example with the axes B and C coplanar to the axis A: however, the illustrated arrangement is more advantageous regarding the effects of the reduction of thickness of the plate 5.

In any case, the axis B of each electric motor 9 is arranged perpendicularly to the axis A of the respective injector 3 and, as will be seen, is insertable and removable relative to the respective seat 12 in a direction parallel to the axis A of the injector, or rather perpendicular to the face 5b of the fixing plate 5, while keeping the valve pin 8 of the respective injector 3 stationary.

In the configuration shown in the drawings, the shaft of the electric rotary motor 9 controls the rotation of the screw 15 of the screw-and-nut assembly 10 via a gear transmission 16. The nut of the screw-and-nut assembly 10, indicated with 16, is traversable along the C axis, and carries a head 17 at its free end, protruding into the cavity 6.

Figure 5:
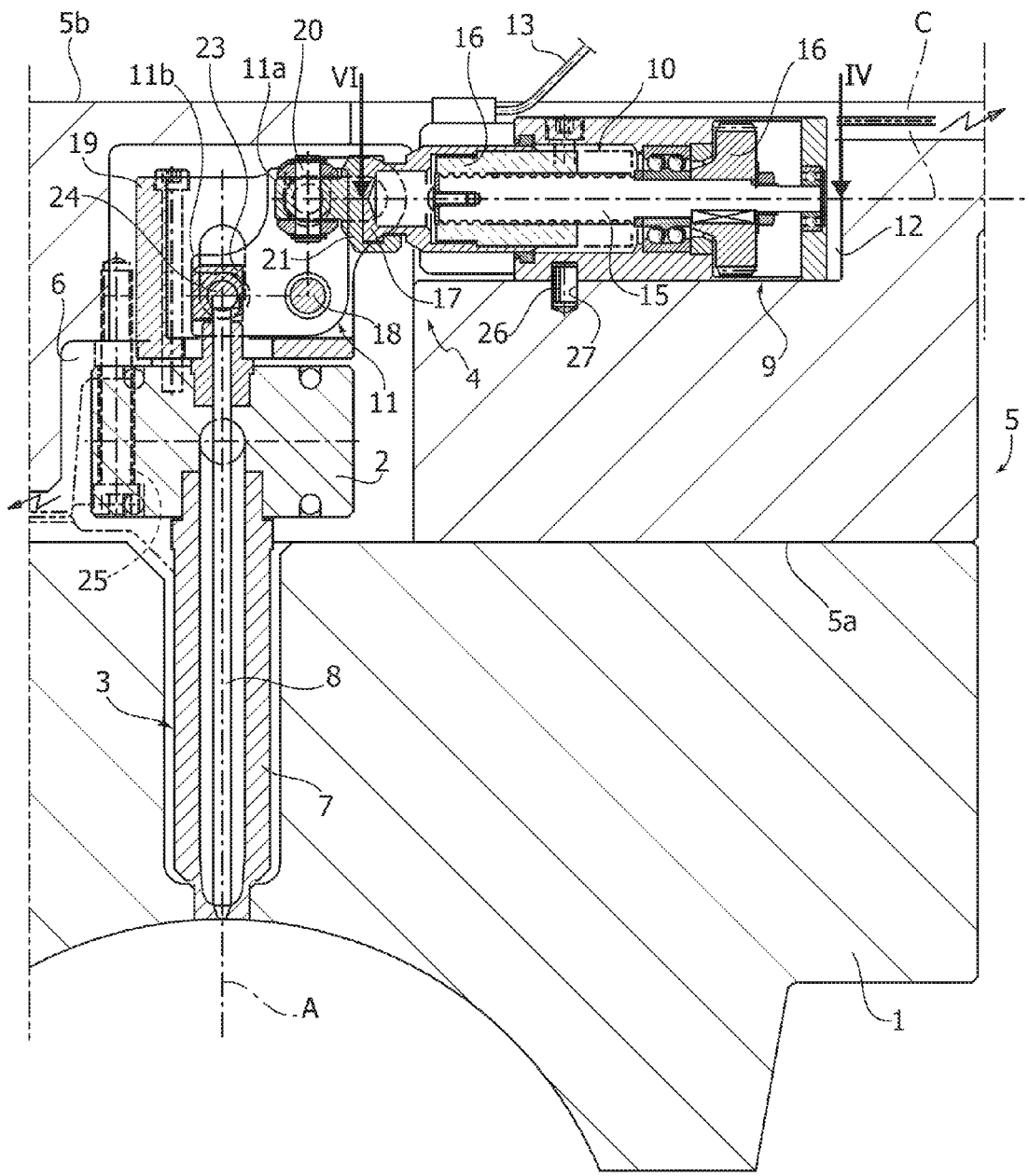
FIG. 5 shows a part of FIG. 1 on an enlarged scale.
Figure 7:
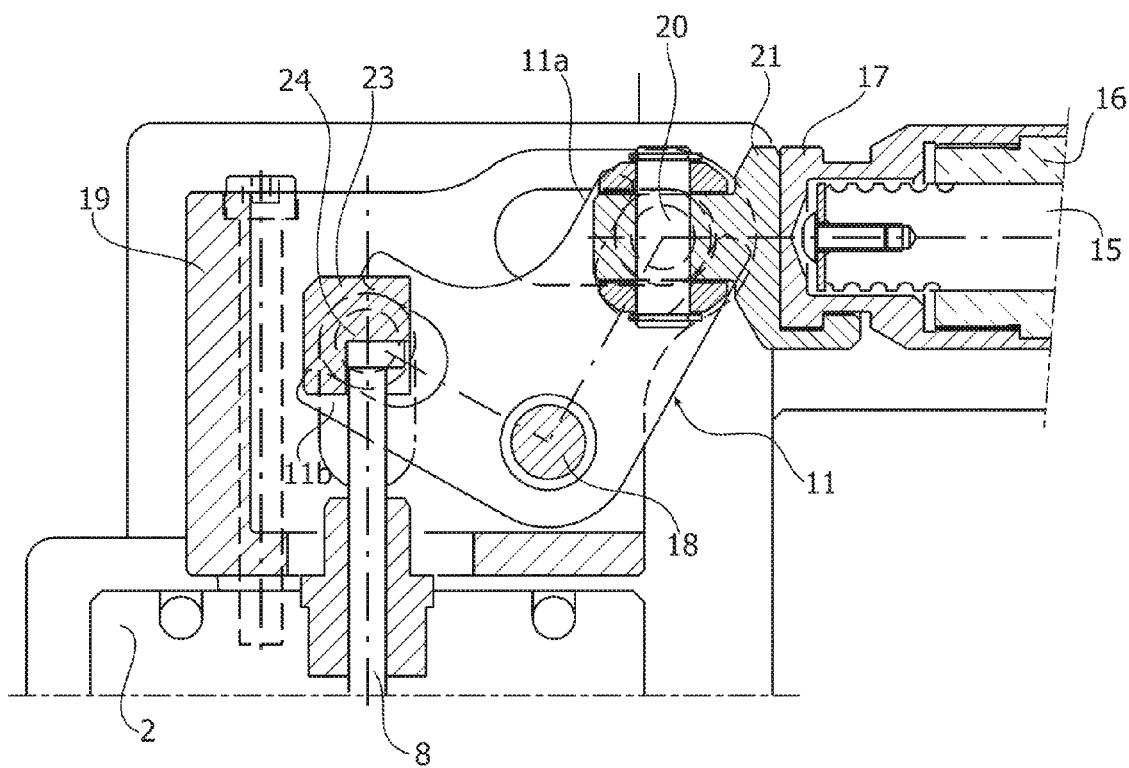
FIG. 7 shows a detail of FIGS. 1 and 5 in a different operating condition, on an enlarged scale.

The oscillating lever 11, represented in FIGS. 1 and 5 in the angular position corresponding to the advanced, closed position of the valve pin 8 and represented in FIG. 7, on an enlarged scale, in the angular position corresponding to the retracted, open position of the valve pin 8, is articulated about a pivot 18 perpendicular to axes A, B, C, carried by a support 19 fixed above the distributor 2. This oscillating lever 11 has a general L-shaped configuration with one arm 11a connected to the nut 16 of the screw-and-nut assembly 10, and the other arm 11b connected to the valve pin 8. In detail, the arm 11a carries a joint 20 for an attachment member 21, which in turn is connected to the head 17 carried by the nut 16 by a quick coupling and uncoupling system, for example of the bayonet type. The other arm 11b is connected, via a slider 23 with a joint head 24, to the valve pin 8. The arrangement is such as to advantageously allow compensating for the thermal deformations of the distributor 2 as well as any manufacturing tolerances that could lead to undesirable axial forces applied to the screw-and-nut assembly 10, as well as to maintain the correct alignment of the valve pin 8 during its displacements.

Figure 8:
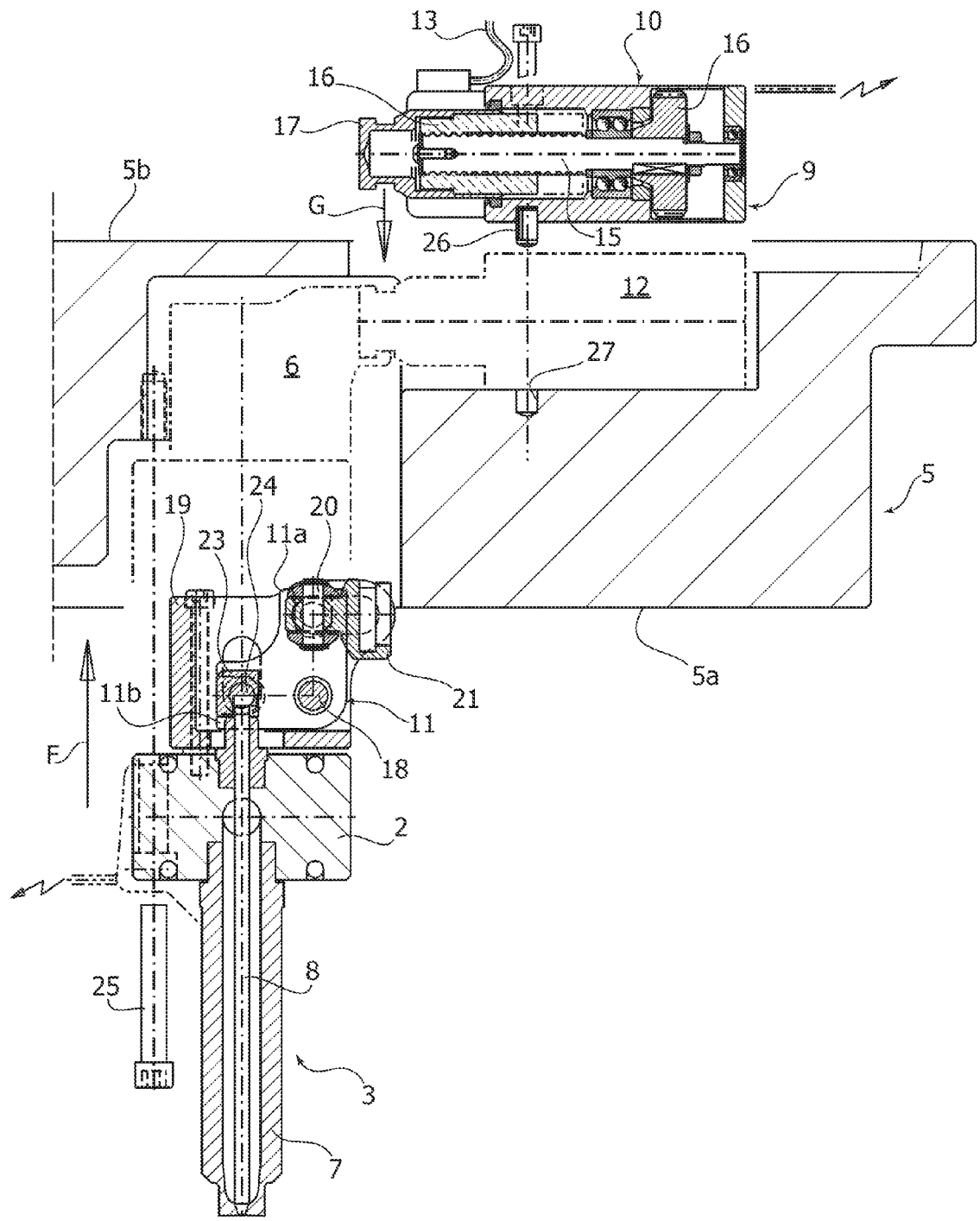
FIG. 8 is a view analogous to FIG. 5, which exemplifies the mode of assembly of components of the plate of the invention.

FIG. 8 exemplifies the mode of assembly, relative to the fixing plate 5, the distributor 2 with the injectors 3, as well as assembly of one of the electric rotary motor 9/screw-and-nut assembly 10 groups and the respective injector 3.

As is evident in this Figure, the distributor 2, carrying the injectors 3 on one side and the supports 19 with the oscillating levers 11 on the opposite side, is inserted in the direction of the arrow F, into the cavity 6 of the face 5a of the fixing plate 5, and is then locked by means of the studs 25, so as to be entirely contained within the cavity 6. The group formed by the electric motor 9 and by the screw-and-nut assembly 10 is inserted within the respective seat 12 of the face 5b of the fixing plate 5 in the opposite direction indicated by the arrow H, in such a way that the head 17 engages with the attachment 21 by quick coupling, while the valve pin 8 and the oscillating lever 11 are kept stationary. To facilitate this engagement and to further improve the alignments, a positioning pin 26 is conveniently provided, configured to engage a corresponding hole 27 of the fixing plate 5.

Finally, each group formed by the motor 9 and the screw-and-nut assembly 10 is fixed to the plate 5 by means of one or more screws.

During operation, the cooling of the electric motors can be advantageously carried out by simple thermal conduction with the plate 5.

It should be noted that the fixing plate 5 may or may not be cooled, depending on the operating temperatures of the apparatus: some plastic materials require mold temperatures in the order of 30-40° C., and therefore cooling the plate 2 is not necessary. In any case, it is possible to provide a cooling system of the plate 5 alone, not illustrated but within the scope of those skilled in the art, fully contained within the plate itself.

The advantages deriving from the invention can be summarized as follows:
   appreciably contained thickness of the fixing plate 5, thanks to the unique arrangement of the units formed by the electric motors 9 and relative transmissions;
   ease of assembly of the plate 5, which can be advantageously provided as a pre-assembled group;
   elimination or at least drastic reduction of the thermal effects, derived from the high temperature of the distributor 2, of the electric motors 9, the related wiring 13 and the components of the screw-and-nut assemblies 10;
   consequent absence of the need for a cooling system of the electric motors 9 and its components;
   reduction in the risk of damage in case of loss of plastic material from the dispenser 2;
   ease of access, and of possible removal of the electric motor 9, with its relative wiring 13, and screw-and-nut assemblies 10, for possible replacement, as well as for its possible reuse in other molding apparatuses.

Of course, the details of construction and the embodiments may vary widely with respect to those described and illustrated, without departing from the scope of the present invention as defined in the following claims.

Thus, in a variant of the invention not illustrated, the oscillating lever 11 could be permanently connected to the screw-and-nut assembly 10, instead of to the distributor 2. In this case, the coupling between the arm 11b of the oscillating lever 11 and the valve pin 8 can be achieved in a conventional way, with a joint of the bayonet type with radial coupling movement with respect to the valve pin 8.

The invention claimed is:

1. A fixing plate of a mold of an injection molding apparatus for plastic material, wherein said molding apparatus comprises a distributor of plastic material to be injected and a series of injectors connected to the distributor and including a nozzle within which a valve pin is axially movable, said fixing plate bearing a respective electric motor with associated transmission for each injector for controlling displacement of the valve pin between a closed position and an open position to allow flow of fluid plastic material under pressure from the distributor to the mold, wherein said fixing plate includes a cavity on a first face, facing the mold, within which the distributor is contained, and each electric motor with the relative transmission is housed, in a quickly insertable and removable manner, within a respective seat arranged on a second face of the fixing plate opposite to said first face, laterally with respect to the corresponding injector.

2. The fixing plate according to claim 1, wherein an axis of each electric motor is arranged perpendicularly to an axis of the respective injector.

3. The fixing plate according to claim 2, wherein each electric motor with the relative transmission is insertable and removable relative to the respective seat in a direction parallel to the axis of the injector, which is perpendicular to said second face of the fixing plate.

4. The fixing plate according to claim 2, wherein each electric motor with the relative transmission is insertable and removable relative to the respective seat, keeping the valve pin of the respective injector stationary.

5. The fixing plate according to claim 2, wherein the electric motor is a rotary motor and the transmission comprises a screw-and-nut assembly.

6. The fixing plate according to claim 5, wherein the electric rotary motor and the screw-and-nut assembly are placed side by side.

7. The fixing plate according to claim 6, wherein the electric rotary motor and the screw-and-nut assembly have respective axes parallel to each other, and perpendicular to an axis of the valve pin.

8. The fixing plate according to claim 5, wherein said transmission also includes an oscillating lever operatively interposed between the screw-and-nut assembly and the valve pin.

9. The fixing plate according to claim 8, wherein a swing axis of said oscillating lever is perpendicular to an axis of the valve pin.

10. The fixing plate according to claim 8, wherein the oscillating lever is carried by the distributor and a quick coupling system is provided between said screw-and-nut assembly and said oscillating lever.

11. The fixing plate according to claim 8, wherein said oscillating lever is carried by the screw-and-nut assembly and a quick coupling system is provided between said oscillating lever and said valve pin.

12. The fixing plate according to claim 10, wherein said oscillating lever is configured to compensate for any thermal expansion of the distributor.

13. The fixing plate according to claim 1, wherein the distributor is fixed directly to the fixing plate by thermal cutting members.

14. The fixing plate according to claim 1, wherein the fixing plate physically separates wiring of the electric motors and wiring of the distributor.

15. The fixing plate according to claim 1, wherein cooling of the electric motors is achieved by thermal conduction with the fixing plate.

16. The fixing plate according to claim 1, wherein the fixing plate includes a cooling system of the fixing plate alone, completely contained within the fixing plate itself.

17. An apparatus for injection molding of plastic material comprising the fixing plate according to claim 1.

* * * * *